United States Patent [19]

Doan

[11] 4,200,904
[45] Apr. 29, 1980

[54] SOLAR POWERED STREET LIGHTING SYSTEM

[76] Inventor: Duc Doan, 7814 S. San Pedro St., Los Angeles, Calif. 90003

[21] Appl. No.: 896,341

[22] Filed: Apr. 14, 1978

[51] Int. Cl.² .............................................. F21G 11/00
[52] U.S. Cl. ................................. 362/183; 362/431
[58] Field of Search ....................... 362/183, 226, 431; 136/89 AC

[56] References Cited

U.S. PATENT DOCUMENTS

| | | | |
|---|---|---|---|
| 2,894,173 | 7/1959 | Paradise | 362/183 |
| 2,901,669 | 8/1959 | Coleman | 136/89 AC |
| 3,048,833 | 8/1962 | Bernheim | 362/431 |
| 3,317,809 | 5/1967 | Bowers et al. | 136/89 AC |
| 3,353,191 | 11/1967 | Dahly | 136/89 AC |
| 3,508,731 | 4/1970 | Jablonski | 362/431 X |
| 3,774,023 | 11/1973 | Cobarg et al. | 362/183 |
| 3,979,656 | 9/1976 | Takeda et al. | 136/89 AC |
| 4,009,535 | 3/1977 | Stock | 136/89 AC |
| 4,041,452 | 8/1977 | Moya | 362/72 |
| 4,080,221 | 3/1978 | Manelas | 136/89 AC |

Primary Examiner—Peter A. Nelson
Attorney, Agent, or Firm—Poms, Smith, Lande & Rose

[57] ABSTRACT

A solar powered street lighting system that is totally independent of any external power supply. Solar panels are connected in such a manner to charge a maintenance-free storage battery with sufficient capacity to light street lights and/or traffic signals. An auxiliary generator may also be provided having a wind driven vane for also charging the battery if sufficient sun light is not available.

5 Claims, 1 Drawing Figure

U.S. Patent  Apr. 29, 1980  4,200,904
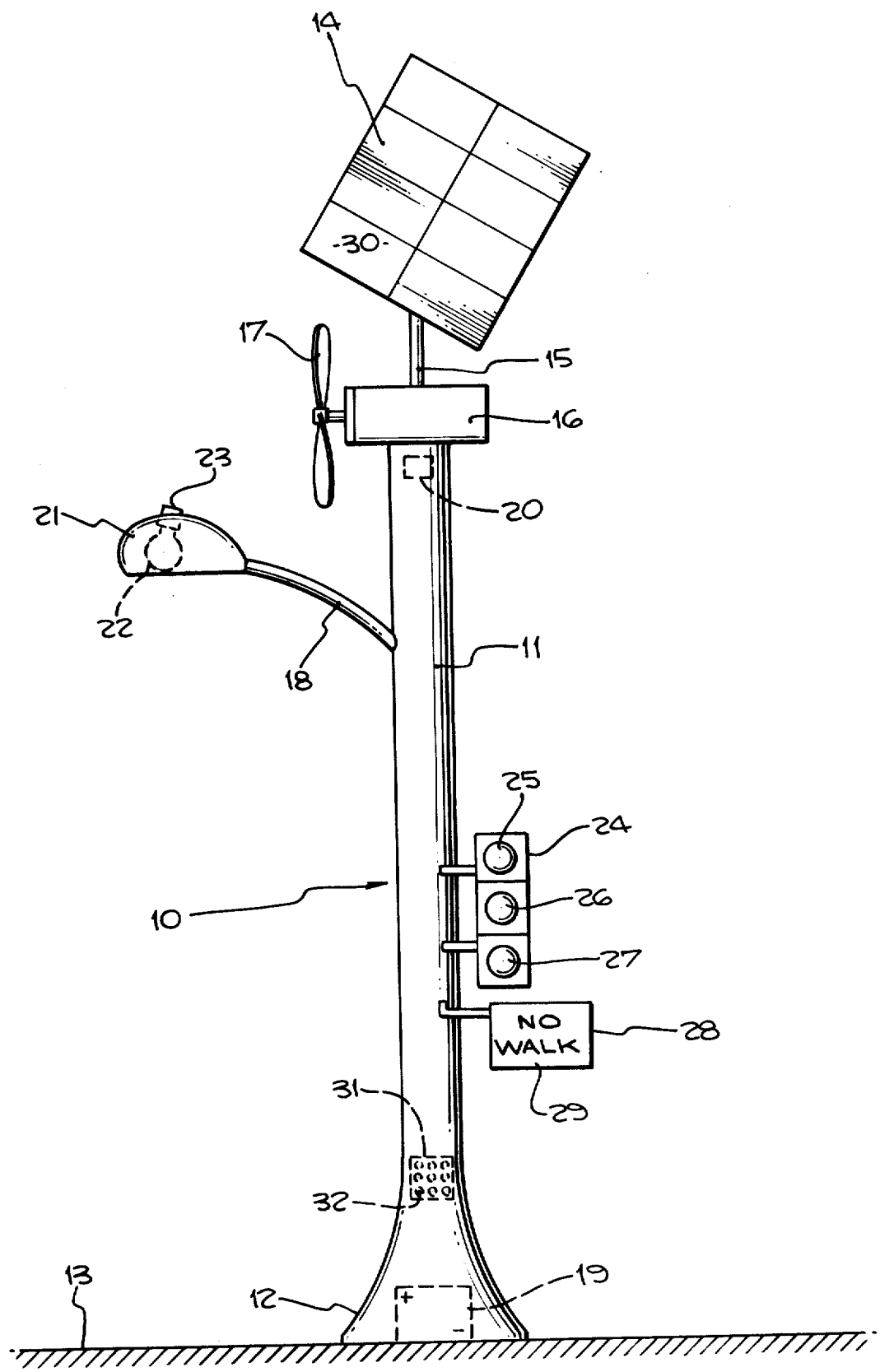

SOLAR POWERED STREET LIGHTING SYSTEM

BACKGROUND OF THE INVENTION

1. Field of the Invention

The invention relates to street lighting and traffic systems; and, more particularly, to a solar powered totally independent combination street lighting and traffic control system.

2. Description of the Prior Art

Various street lighting systems are used throughout the world. Such systems consume quite a bit of energy and require much maintenance. In recent years, because of the shortage of fuel, there has been increased interest in the use of energy from the sun and wind power as substitutes for fossil fuels. There is thus a need for utilizing these concepts in street lighting and traffic systems to save on the costs of such fuels and conserve such fuels. Further, a totally independent solar powered system will save on installation costs since it does not require connection to a main power system and will operate even in blackout situations since it is not dependent on a main power supply and thus will save lives during emergencies caused by blackouts.

Further, there is a need for such a system which can be readily modified to deliver any desired wattage so that any suitable bulb may be illuminated.

SUMMARY OF THE INVENTION

It is an object of this invention to provide a solar powered street lighting system totally independent of an external power supply.

It is a further object of this invention to provide such a system which includes an auxiliary wind driven generator for augmenting the capacity of the system battery.

It is still another object of this invention to provide such a system which includes optional traffic signals therein.

These and other objects are preferably accomplished by providing a solar powered street lighting system that is totally independent of any external power supply. Solar panels are connected in such a manner to charge a maintenance-free storage battery with sufficient capacity to light street lights and/or traffic signals. An auxiliary generator may also be provided having a wind driven vane for also delivering capacity to the battery if sufficient sun light is not available.

BRIEF DESCRIPTION OF THE DRAWING

The FIGURE is a vertical view of a street light and traffic signal system in accordance with the teachings of the invention.

DESCRIPTION OF THE PREFERRED EMBODIMENT

Referring now to the drawing, a solar powered combination street light and traffic signal light system 10 is shown. System 10 includes an upright pole 11 having a base 12 adapted to rest on a supporting surface 13. As particularly contemplated in the teachings of my invention, a plurality of solar cell panels 14 are fixedly mounted on a rod or shaft 15 at the upper end of pole 11. An alternator 16 is also secured to the top of pole 11 below panels 14. A windmill 17 is coupled to the internal shaft (not shown) of alternator 16. Any suitable alternator may be used, such as a conventional 12 V. D.C. alternator. In fact, any D.C. generator, or A.C. generator in combination with rectifying means, may be used. A street light 18 extends from pole 11 and a maintenance-free storage battery 19 is disposed in the base 12 of pole 11. A conventional regulator 20 is disposed in pole 11, below generator 16 coupled to both battery 19 and generator 16 (and panels 14, if generator 16 is eliminated).

Street light 18 includes a lamp housing 21 having a lamp 22 and a photocell 23 coupled thereto. A traffic signal light 24 is also provided on pole 11 below light 18 having the usual red, green and yellow or caution lights 25 through 27 thereon. A pedestrian signal 28 may also be disposed on pole 11 below light 24 having suitable lighted pedestrian cautioning indicia 29 as is well known in the art.

The position of the various components on pole 11 may be varied as desired. Further, certain components, as will be discussed, may be optional. For example, system 10 may be used without the pedestrian signal 28 if such is not needed out in the field. Traffic signal light 24 may also be omitted if only a street light 18 is required.

The voltage of battery 19 will be dependent on the wattage required for producing the luminosity necessary for the various lights.

Panels 14 comprise a plurality of individual solar cell panels 30 having solar cells therein connected in series to provide enough voltage, as for example, 12 volts, to charge a preselected battery 19, as for example, a three year maintenance free dry storage battery. For example, a 12 volt, 100 amp battery may be used in each system 10. Each panel 30 is connected in parallel to provide sufficient amperage for battery 19. A description of a solar battery sufficient for purposes of my invention made up of several solar cells appears on pages 14–16 of "Solar Cells and Photocells", Rufus P. Turner, 1975.

It can be seen from pages 14 and 15 that, at 2000 foot candles, the average open-circuit output voltage of a typical silicon cell is approximately 0.3 to 0.6 volts. Thus, the solar battery described on page 16 of Solar Cells consists of a panel of 30½ volt silicon photovoltaic cells connected in series with a diode which prevents backflow of current from the battery through the cells during darkness. In bright sunlight, this battery delivers 12 volts at 0.1 amps and has a capacity of 30 watt-hours per week. In our system 10, we can supplement this by using more panels connected in parallel to obtain more current.

Thus, silicon cells and arrays are well known for light energy conversion. Solar power conversation systems are available that are directly coupled with battery charger energy storage systems.

The assembly of panels 14, when exposed to sun light, generates sufficient voltage to charge battery 19 in good weather. However, in order that system 10 effective year round and in all weather conditions, alternator 16, which may be optional, is provided having windmill 17 which is rotated by wind to drive the alternator 16 and continuously generate a source of power for battery 19. It is to be understood that suitable electrical conduits (not shown) extend between battery 19 and the various components of system 10.

In mild climates, as Southern California, panels 14 alone may be sufficient to provide sufficient voltage to battery 19. The combinator of panels 14 and alternator 16 generates sufficient voltage in all climates and under all weather conditions to charge a three-year maintenance free battery 19.

Regulator 20 assures constant charge to battery 19 under all wind speeds and variations on the amount of sun light. Bulb 22 is selected to match the voltage of battery 19 as are the lights 25 through 27 and signal 28.

Photocell 28 is automatically actuated by light to switch on bulb 22 when the sun sets and switch bulb 22 off when the sun appears. This is sufficient for tropical and temperate zones; in polar zones, a timer switch (not shown) may be substituted.

Although a battery 19 of a preselected amperage and voltage has been disclosed, obviously much higher amperage can be used which would make the system 10 independent for longer periods of time and render auxiliary power means, such as alternator 16, unnecessary. Of course, system 10 can be coupled to a main power supply to provide back-up but it is not necessary in most environments.

Traffic light 24 can be any suitable type. For example, the emergency flashing lights used on police cars can be adapted to system 10 since such lights are low-powered and fulfil safety requirements. For example, light bars drawing 10 amps operating at 12 volts are known in the art. Various street lights may of course be used, as discussed above, as for example, the relatively new quartz-halogen bulbs of suitable wattage, as 100 watts. Of course, bulbs of other wattage and type, such as 175 W, 400 W, 250 W, mercury vapor type, may be used.

If desired, a control board 31 may be provided on pole 11 having signal lights 32 or the like elctronically coupled to the various components of system 10 for indicating the state thereof. Although board 31 is shown exposed, it may be internal of pole 11 with access available through a door or the like on pole 11.

It can be seen that I have described a system which can be modified to provide solar panels which deliver any desired wattage thus enabling bulbs of various brightness and type to be used. Preexisting light poles can be quickly and easily modified to provide solar energy in accordance with the teachings of my invention.

I claim:

1. A totally independent street light system comprising:
    an upright pole adapted to be mounted on a supporting surface;
    a dry storage battery;
    a plurality of solar panels coupled to said battery, each of said panels having a plurality of solar cells connected in series for providing a predetermined voltage to said battery, each of said panels connected in parallel to provide a predetermined amperage to said battery, all of said panels being mounted in a single unitary assembly on said pole;
    a street light mounted on said pole electrically coupled to said battery and actuated by said battery;
    wind driven alternator means mounted on said pole coupled to said battery for providing capacity to said battery augmenting said solar panels; and
    a light actuated photocell coupled to said light for selectively lighting said light dependent upon light conditions at said pole.

2. In the system of claim 1 further including a traffic signal having a plurality of vertically linearly disposed lights mounted on said pole electrically connected to said battery.

3. In the system of claim 1 wherein said battery is a 12 V. 100 amp, D.C. three-year maintenance free dry storage battery.

4. In the system of claim 3 wherein said light is a 12 Volt D.C. light.

5. In the system of claim 1 wherein each of said panels comprises at least thirty $\frac{1}{2}$ Volt silicon photovoltaic cells connected in series with a diode to prevent backflow of current from the battery through the cells during darkness, the total number of said panels mounted in parallel being sufficient to provide a total current output to return said battery to its rated amperage capacity after lighting of said light.

* * * * *